United States Patent Office 3,293,287
Patented Dec. 20, 1966

3,293,287
3-(POLYHALOBICYCLO[2.2.1]-HEPT-5-EN-2-YL-BENZYLTHIO)-ALANINE
Carleton W. Roberts, Midland, and Daniel H. Haigh, Beaverton, Mich., assignors to The Dow Chemical Company, Midland, Mich., a corporation of Delaware
No Drawing. Filed Mar. 5, 1965, Ser. No. 437,543
4 Claims. (Cl. 260—516)

This application is a continuation-in-part of our co-pending application Serial Number 240,139, filed November 26, 1962, now abandoned.

This invention relates to organic chemistry and more particularly to a compound of the formula:

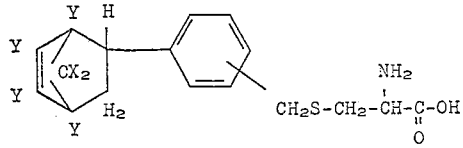

and also to the alkali metal and ammonium salts thereof, wherein X represents hydrogen or halogen of atomic weight less than 50, and Y represents halogen of atomic weight of 25 to 100; and to a method of synthesis of the compounds.

The new compounds which are acids may be prepared by the Diels-Alder diene synthesis. The reaction may be simply carried out by causing a reaction of a cyclopentadiene compound of the formula

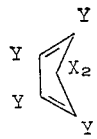

wherein X and Y have the values hereinbefore indicated, as the diene with, as dienophile, an ar-vinylthioalanine compound of the formula

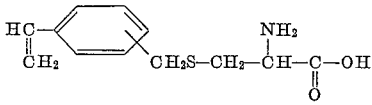

to obtain the adduct product. The reactants are consumed in equimolecular amounts and may thus be supplied to the reaction. It is advantageous but not necessary to use an inert liquid reaction medium, such as xylene, hexane, heptane, octane, nonane, petroleum ether, benzene, toluene, cumene, ethylbenzene, diethylbenzene, ethyltoluene, chlorobenzene, orthodichlorobenzene, chlorotoluene, chloroethylbenzene, chloroxylene, and the like, of which the boiling serves to control the reaction temperature. The reaction may be carried out at any temperature from about 60° C. to about 200° C., but is preferably carried out at about 100° C. to 160° C. A reaction mixture of the reactants and reaction medium, if any, may be brought together in a reaction vessel whereupon the desired reaction takes place to some extent. When more rapid rate of reaction is desired, the reactants may be caused to react at a higher rate by heating the reaction mixture. The reaction usually goes to completion in from about one hour to about 60 hours, with formation of desired product and minor amounts of other substances. The product can be used in a completely crude form for many of its advantageous uses. When it is desired to recover the desired compound essentially pure, the product of reaction can be purified in known procedures, for example, fractional crystallization.

Suitable diene starting materials in the present synthesis include hexachlorocyclopentadiene, 1,2,3,4-tetrachlorocyclopentadiene, 1,2,3,4-tetrabromo-5,5-difluorocyclopentadiene, and the like.

The acid products of the present invention are conveniently prepared in an alternate synthesis. In such alternate synthesis, there is first prepared an α-halobenzyl polyhalobicycloheptene of the formula

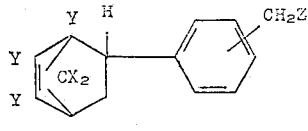

wherein Z is a halogen of atomic weight of from about 25 to about 150. The compound is readily prepared by the Diels-Alder reaction of a polyhalopentadiene of the formula

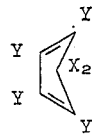

and an α-halo vinyltoluene compound. The halogen Z may be chlorine, bromine, or iodine; if chlorine, the compound reacts at a disadvantageously slow rate but under employed conditions exclusively at the site of the chlorine on the methylene side chain. When the halogen is bromine, the resulting bromomethylphenylpolyhalobicycloheptene compound enters readily into the further reaction preparative of the products of the present invention and the product is, at least on a laboratory scale, obtained in good yield.

When iodine is employed good results are obtained but the necessary starting substances tend to be disadvantageously expensive.

In any event, the said halomethylphenylpolyhalobicycloheptene is then caused to react with cysteine. Reaction is caused by contacting together the cysteine and the halomethylphenylpolyhalobiscycloheptene compound in inert liquid reaction medium with heating if desired. The ions of hydrogen halide are liberated and the present acid product formed.

When a salt of the present acids is formed, it is advantageously prepared by preparing first the acid of the present invention, and thereafter reacting the acid with a source of cations of desired identity. Suitable such sources include alkali metal hydroxides, carbonates, and silicates, ammonia, ammonia water, ammonium carbonate; or an ion exchange resin of alkaline nature charged with suitable cations. The salt form of the present compounds may be desired for its solubility, which, within the present scope, is greater than the solubility of the acid substances, in water.

The present compounds have various uses. They are useful as substrates upon supports in chromatographic columns in vapor phase chromatography of substances of relatively high vapor pressure. Also, when added to otherwise flammable polymers, the present substances greatly reduce flammability of such polymers.

The following examples without more will enable those skilled in the art to practice the present invention.

EXAMPLE 1.—PREPARATION OF 3-(p-(1,4,5,6,7,7-HEXACHLOROBICYCLO[2.2.1]-HEPT - 5 - EN - 2-YL)BENZYLTHIO)-ALANINE

A mixture of 78 grams (0.185 mole) of 2-(p-chloromethylphenyl)-1,4,5,6,7,7-hexachlorobicyclo[2.2.1] - heptene-5, 34 grams (0.28 mole) cysteine and 500 milliliters isopropanol is placed in a one liter round-bottom flask over a steam bath and equipped with a reflux condenser, and heated to reflux temperature, about 85° C. The resulting mixture is heated under reflux for 16 hours to prepare the present product which precipitates as a solid in the mixture. The reaction mixture is cooled and filtered to obtain a crude product as residue. The residue solid is recrystallized from a mixture of 3 parts methanol and 1 part chloroform to obtain, in good yield, a white crystalline solid 3 - (p - (1,4,5,6,7,7 - hexachlorobicyclo-[2.2.1]hept-5-en-2-yl)benzylthio)-alanine product melting with at least incipient decomposition at 285–286° C. Infrared spectrum analysis confirms the assigned structure. The product has insecticidal properties.

EXAMPLE 2.—PREPARATION OF 3 - (p - (1,4,5,6-TETRACHLOROBICYCLO[2.2.1] - HEPT - 5 - EN-2-YL)BENZYLTHIO)-ALANINE

A mixture of 223.3 grams (1.0 mole) of p-vinylbenzyl cysteine and 500 milliliters toluene is placed in a one liter, round-bottomed flask equipped with heating mantle, dropping funnel and reflux condenser and heated to reflux temperature, about 110–120° C. Thereto during 45 minutes is added, dropwise, 201 grams (1 mole) 1,2,3,4-tetrachlorocyclopentadiene. The resulting mixture is heated under reflux for 30 hours to prepare the present product. The reaction mixture is cooled and filtered to obtain a crude product as residue. The residue solid is recrystallized from a mixture of 3 parts methanol and 1 part chloroform, to obtain, in good yield, a white solid 3-(p-(1,4,5,6-tetrachlorobicyclo[2.2.1]hept - 5 - en - 2 - yl)benzylthio)-alanine product melting with decomposition at a temperature above 250° C. and useful as an insecticide. Infrared spectrum analysis confirms the assigned structure.

EXAMPLE 3.—SODIUM SALT of 3-(p-(1,4,5,6,7,7-HEXACHLOROBICYCLO[2.2.1]-HEPT - 5 - EN - 2-YL)BENZYLTHIO)-ALANINE

Sodium carbonate decahydrate ("washing soda"), 2.86 grams, 0.01 gram mole, is dispersed with stirring in 100 milliliters water to obtain a solution of sodium carbonate. Thereinto, with stirring, is added, slowly, portionwise, and at about 60° C., 5.1 grams, a slight molar excess, of 3-(p-(1,4,5,6,7,7-hexachlorobicyclo[2.2.1] - hept - 5 - en-2-yl)benzylthio)-alanine. Stirring is continued until the alanine compound passes essentially completely into solution. The resulting solution is filtered, evaporated to dryness over a steam bath, extracted with acetone, and recrystallized from a small amount of water to obtain an odorless, white crystalline sodium salt of 3-(p-(1,4,5,6,7,7-hexachlorobicyclo[2.2.1]-hept-5 - en - 2 - yl)benzylthio)-alanine.

EXAMPLE 4.—AMMONIUM SALT OF 3-(p-(1,4,5,6-TETRABROMO - 7,7 - DIFLUOROBICYCLO[2.2.1]-HEPT-5-EN-2-YL)BENZYLTHIO)-ALANINE

Equimolecular amounts of p-vinylbenzyl chloride and tetrabromodifluorocyclopenetadiene are reacted together to obtain, as Diels-Alder adduct, 2-(p-chloromethylphenyl)-1,4,5,6 - tetrabromo - 7,7 - difluorobicyclo[2.2.1] heptene-5.

This substance is dispersed in isopropanol and, therewith, also, a moderate molecular excess of cysteine, and the resulting mixture heated at reflux over a steam bath for 20 hours, to obtain a 3-(p-(1,4,5,6-tetrabromo-7,7-difluorobicyclo[2.2.1]hept-5-en-2-yl)benzylthio) - alanine product, as a white crystalline solid which precipitates in the mixture. The resulting mixture is cooled and filtered to obtain the crude product as residue; the residue is recrystallized from a methanol-chloroform mixture to obtain a white crystalline solid product of which infrared spectrum analysis confirms the assigned structure as 3-(p-(1,4,5,6-tetrabromo-7,7-difluorobicyclo[2.2.1]hept - 5-en-2-yl)benzylthio)-alanine.

The product is then dispersed in water, and thereto a substantial molecular excess of aqueous ammonia is added, with stirring. When the product is entirely dissolved, excess ammonia is driven off by gently warming; the resulting product is evaporated gently to dryness over a hot water bath, to obtain the ammonium salt of the said alanine compound.

It is a colorless crystalline solid, white in mass, and soluble in water.

In similar procedures the other products of the present invention are readily prepared.

Illustrative of utility in the present compounds, the compound 3-(p - (1,4,5,6,7,7 - hexachlorobicyclo[2.2.1]-hept-5-en-2-yl)-benzylthio)-alanine is charged as toxicant in known procedures in an aerosol bomb. From this bomb it is discharged over a body of water containing live larvae of mosquitoes of various species. A relatively uniform dispersion of the compound over the water surface is effected, at the rate of several milligrams per square decimeter, the exact amount of deposit not determined. Twenty-four hours after application the water is examined for mosquito larvae: all larvae that are observed are dead.

Further illustrative of utility in a compound of the present invention, such compound is taken up in solution in a solvent, and the solvent solution intimately and thoroughly mixed and stirred with an amount of chemically cleaned diatomaceous earth representing from about twenty to about four times the weight of the compound of the present invention; solvent is removed by vaporization to obtain a treated infusorial earth uniformly coated with and bearing a deposit of the compound of the present invention. With repulverization if necessary, the treated infusorial earth is then filled under suction and with the aid of sonic vibration into a coiled otherwise empty column for use in vapor phase chromatography at temperatures at which the compound of the present invention is mechanically stable. The chromatographic separations upon such column, with a compound of the present invention functioning as substrate, are useful in research procedures.

We claim:
1. Member of the group consisting of a compound of the formula

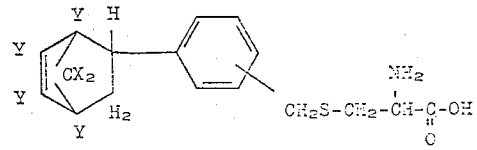

its alkali metal salts, and its ammonium salt, wherein X represents a member of the group consisting of hydrogen and halogen of atomic weight less than 50, and Y represents halogen of atomic weight of 25 to 100.

2. 3-(p - (1,4,5,6,7,7 - hexachlorobicyclo[2.2.1] - hept-5-en-2-yl)benzylthio)-alanine.

3. 3-(p-(1,4,5,6-tetrachlorobicyclo[2.2.1] - hept - 5 -en-2-yl)benzylthio)-alanine.

4. Sodium salt of 3-(p-(1,4,5,6,7,7 - hexachlorobicyclo [2.2.1]-hept-5-en-2-yl)benzylthio)-alanine.

References Cited by the Examiner

UNITED STATES PATENTS

| | | | |
|---|---|---|---|
| 2,757,196 | 7/1956 | Doerner | 260—534 |
| 2,890,246 | 6/1959 | McKinney et al. | 260—534 |
| 2,970,168 | 1/1961 | Horn et al. | 260—516 |
| 3,091,566 | 5/1963 | Schmerling et al. | 167—30 |

FOREIGN PATENTS

| | | |
|---|---|---|
| 768,098 | 2/1957 | Great Britain. |

OTHER REFERENCES

Ungnade et al.: Chem. Rev., vol. 58 (1958), pp. 249–320 (pp. 250, 268–269 and 297 relied on).

J. Org. Chem., vol. 26, p. 937.

J. Gen. Chem., (Russia) vol. 5, pp. 555–561.

LORRAINE A. WEINBERGER, *Primary Examiner.*

R. K. JACKSON, *Assistant Examiner.*